United States Patent
Swartzel et al.

(10) Patent No.: US 6,552,663 B2
(45) Date of Patent: Apr. 22, 2003

(54) PRODUCT INFORMATION DISPLAY SYSTEM WITH EXPANDED RETAIL DISPLAY FUNCTIONS

(75) Inventors: Stanley J. Swartzel, Trotwood, OH (US); Timothy B. Honeck, Brentwood, TN (US)

(73) Assignee: Display Edge Technology, Ltd., Dayton, OH (US)

( * ) Notice: Subject to any disclaimer, the term of this patent is extended or adjusted under 35 U.S.C. 154(b) by 0 days.

(21) Appl. No.: 09/784,359

(22) Filed: Feb. 15, 2001

(65) Prior Publication Data

US 2001/0045893 A1 Nov. 29, 2001

Related U.S. Application Data

(60) Provisional application No. 60/182,996, filed on Feb. 16, 2000.

(51) Int. Cl.⁷ .............................................. G08B 13/14
(52) U.S. Cl. .............. 340/572.1; 340/5.91; 340/825.54; 235/383
(58) Field of Search ........................ 340/572.1, 572.4, 340/825.54, 825.06, 5.91; 235/383; 705/20, 26

(56) References Cited

U.S. PATENT DOCUMENTS

| | | | | |
|---|---|---|---|---|
| 4,002,886 A | * | 1/1977 | Sundelin | 235/61.7 |
| 4,814,742 A | * | 3/1989 | Morita et al. | 340/825.54 |
| 4,888,709 A | * | 12/1989 | Revesz et al. | 364/518 |
| 4,924,363 A | | 5/1990 | Kornelson | 362/125 |
| 5,083,638 A | * | 1/1992 | Schneider | 186/61 |
| 5,111,606 A | | 5/1992 | Reynolds | 40/642 |
| 5,151,684 A | * | 9/1992 | Johnsen | 340/572 |
| 5,172,614 A | * | 12/1992 | Poland et al. | 364/401 |
| 5,233,773 A | | 8/1993 | Reynolds | 40/642 |
| 5,448,226 A | | 9/1995 | Failing, Jr. et al. | 340/825.35 |
| 5,455,409 A | * | 10/1995 | Smith et al. | 235/385 |
| 5,467,474 A | | 11/1995 | Ackerman et al. | 395/800 |
| 5,537,126 A | | 7/1996 | Kayser et al. | 345/1 |
| 5,736,967 A | | 4/1998 | Kayser et al. | 345/1 |
| 5,751,221 A | * | 5/1998 | Stanfield et al. | 340/825.35 |
| 5,753,900 A | | 5/1998 | Goodwin, III et al. | 235/383 |
| 5,771,003 A | * | 6/1998 | Seymour | 340/568 |
| 5,797,131 A | * | 8/1998 | Goodwin, III et al. | 705/16 |
| 5,850,187 A | * | 12/1998 | Carrender et al. | 340/825.54 |
| 5,870,714 A | * | 2/1999 | Shetty et al. | 705/20 |
| 5,873,069 A | * | 2/1999 | Reuhl et al. | 705/20 |
| 5,887,271 A | * | 3/1999 | powell | 705/14 |
| 5,898,383 A | | 4/1999 | Forsythe | 340/825.35 |
| 5,907,143 A | | 5/1999 | Goodwin, III | 235/383 |
| 5,926,797 A | | 7/1999 | Goodwin, III | 705/20 |
| 5,929,770 A | | 7/1999 | Faita | 340/825.35 |
| 5,943,654 A | | 8/1999 | Goodwin, III et al. | 705/14 |
| 5,977,875 A | * | 11/1999 | Lin et al. | 340/570 |
| 5,987,427 A | | 11/1999 | Goodwin, III et al. | 705/21 |
| 5,988,498 A | * | 11/1999 | Hoell | 235/383 |
| 6,012,244 A | | 1/2000 | Begum et al. | 40/661.03 |
| 6,021,395 A | | 2/2000 | Goodwin, III | 705/20 |
| 6,046,682 A | * | 4/2000 | Zimmerman et al. | 340/825.49 |
| 6,047,263 A | | 4/2000 | Goodwin, III | 705/20 |
| 6,089,453 A | * | 7/2000 | Kayser et al. | 235/383 |
| 6,269,342 B1 | * | 7/2001 | Brick et al. | 705/20 |

FOREIGN PATENT DOCUMENTS

WO 9727791 8/1997

OTHER PUBLICATIONS

International Search Report relating to corresponding Internation Application No. PCT/US00/08499 (issued Nov. 23, 2000).

* cited by examiner

*Primary Examiner*—Benjamin C. Lee
*Assistant Examiner*—Phung Nguyen
(74) *Attorney, Agent, or Firm*—Thompson Hine LLP

(57) ABSTRACT

In an electronic product information display system including multiple product storage areas, a plurality of display tags associated with the product storage areas, a multiplicity of the display tags including an annunciator, a controller connected for communication with the display tags, and a portable wireless terminal operable for communication with the controller, expanded retail mode functions and methods are provided for stocking products, locating products, printing new overlay labels for tags, and performing tag maintenance.

27 Claims, 6 Drawing Sheets

PRODUCT INFORMATION DISPLAY SYSTEM WITH EXPANDED RETAIL DISPLAY FUNCTIONS

PRIORITY

This application claims the benefit of provisional application Ser. No. 60/182,996 filed Feb. 16, 2000.

TECHNICAL FIELD

The present invention relates generally to electronic product information display systems, and more particularly to expanded retail display functions within an electronic product information display system.

BACKGROUND

Traditional electronic product information display systems typically display price information associated with a product. Exemplary product information display systems, also known as electronic shelf label (ESL) systems, are shown and described in U.S. Pat. Nos. 5,537,126; 5,737,567 and 6,089,453.

The display of alternative information may be desirable in a variety of situations in order to take full advantage of such electronic product information display systems.

SUMMARY

In one aspect, in an electronic product information display system including multiple product storage areas, a plurality of display tags associated with the product storage areas, a multiplicity of the display tags including an annunciator, a controller connected for communication with the display tags, and a portable wireless terminal operable for communication with the controller, a method for locating at least one product includes the steps of: (a) identifying a desired product using the portable wireless terminal; (b) communicating the desired product to the controller using the portable wireless terminal; (c) identifying, by the controller, at least one display tag associated with the desired product; (e) communicating, from the controller to the identified display tag, a signal for activating the annunciator of the identified display tag.

In another aspect, n an electronic product information display system including multiple product storage areas, a plurality of display tags associated with the product storage areas, a multiplicity of the display tags including an annunciator, a controller connected for communication with the display tags, a portable wireless terminal operable for communication with the controller, and the system operable in a plurality of modes, a method for retrieving multiple products stored in the product storage areas involves: (a) uploading a product list to the portable wireless terminal and displaying at least part of the list on a display of the portable wireless terminal; (b) selecting a desired product from the product list of the portable wireless terminal; (c) communicating the desired product to the controller using the portable wireless terminal; (d) the controller identifying a display tag associated with the desired product and activating the annunciator of the associated display tag; (e) retrieving the desired product; (f) marking the desired product as retrieved on the product list on the portable wireless terminal; (g) updating the product list on the portable wireless terminal by removing the retrieved product from the product list; and (h) repeating steps (b) through (g) for each product on the product list.

In a further aspect, in an electronic product information display system including multiple product storage areas, a plurality of display tags associated with the product storage areas, a multiplicity of the display tags including an annunciator, a controller connected for communication with the display tags, and a portable wireless terminal operable for communication with the controller and having a scanner for scanning product codes, a method for facilitating product stocking involves: (a) scanning a product code of a product to be stocked using the portable wireless terminal; (b) communicating information regarding the scanned product to the controller; (c) the controller identifying a display tag associated with the scanned product and activating the annunciator of the associated display tag to alert the user to the appropriate stocking location.

In yet another aspect, in an electronic product information display system including multiple product storage areas, a plurality of display tags associated with the product storage areas, each product display tag including a display screen, a controller connected for communication with the display tags, a method for displaying secondary display information on at least one display tag involves: (a) displaying primary display information by a given display tag; (b) activating an input device of the given display tag; (c) communicating the activation of the input device of the given display tag to the controller; (d) the controller retrieving secondary display information for the given tag from a database; (e) the controller transmitting the secondary display information to the given display tag; and (f) the given display tag displaying the received secondary display information.

In still a further aspect, in an electronic product information display system including multiple product storage areas, a plurality of display tags associated with the product storage areas, a multiplicity of the display tags including an annunciator, a controller connected for communication with the display tags, a portable wireless terminal operable for communication with the controller, and a printer associated with the portable wireless terminal, a method for replacing at least one overlay label for a display tag involves: (a) uploading a display tag or product list to the portable wireless terminal and displaying at least part of the list on a display of the portable wireless terminal; (b) selecting a list item from the list on the portable wireless terminal; (c) communicating the list item to the controller using the portable wireless terminal; (d) the controller activating a annunciator of a given display tag associated with the selected list item; (e) the controller communicating print information for the given display tag to the portable wireless terminal; (f) the portable wireless terminal causing the printer to print a new overlay label for the given display tag according to the received print information.

In another aspect, in an electronic product information display system including multiple product storage areas, a plurality of display tags associated with the product storage areas, a multiplicity of the display tags including an annunciator, a controller connected for communication with the display tags, and a portable wireless terminal operable for communication with the controller, a method for performing display tag maintenance involves: (a) uploading a display tag or product list to the portable wireless terminal and displaying at least part of the list on a display of the portable wireless terminal; (b) selecting a list item from the list on the portable wireless terminal; (c) communicating the list item to the controller using the portable wireless terminal; (d) the controller activating an annunciator of a given display tag associated with the selected list item; (e) locating the given display tag via the annunciator and performing required display tag maintenance.

DETAILED DESCRIPTION

Overview of the System

Figure 1:
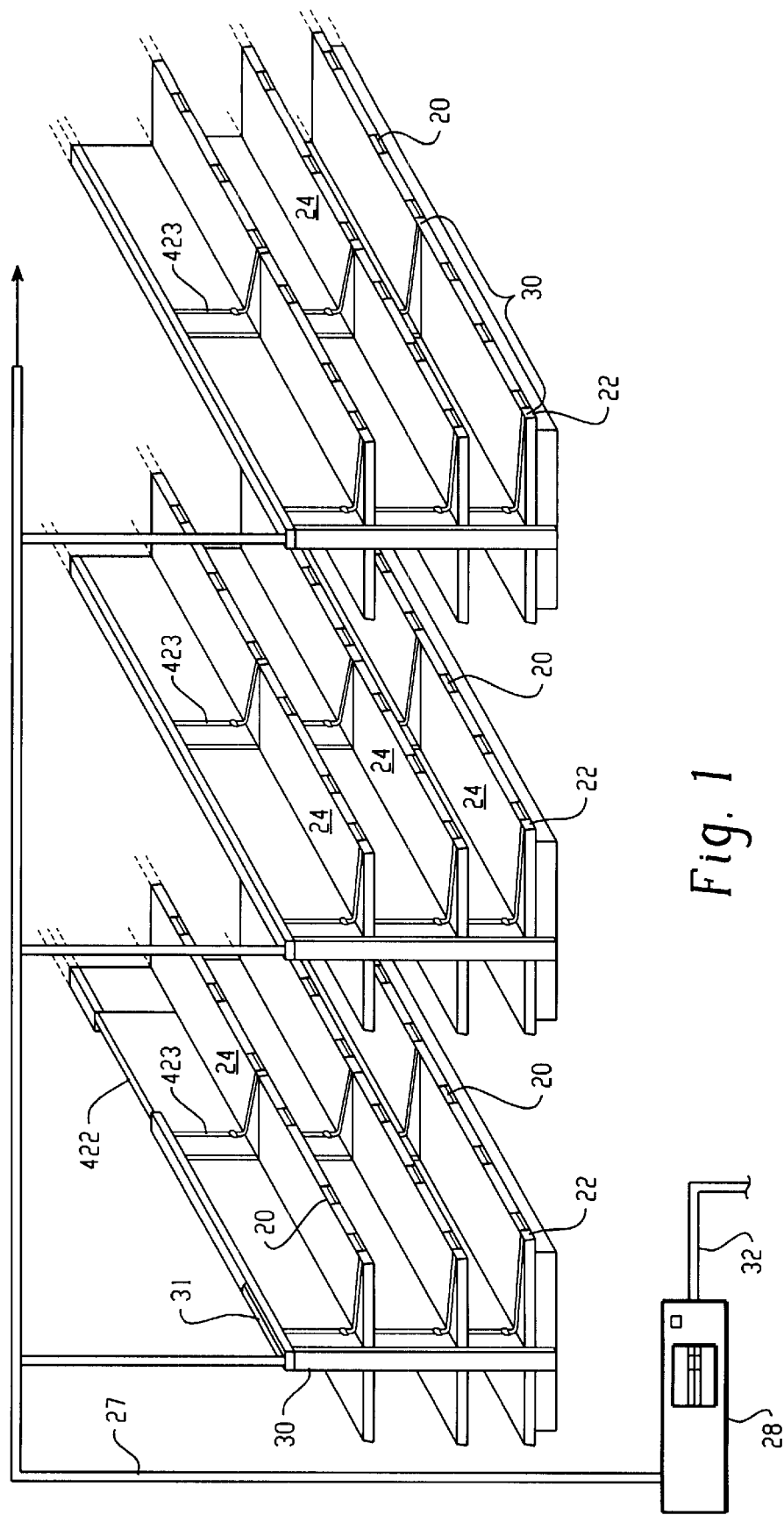
FIG. 1 is a perspective view of a typical layout of part of a retail store including an electronic product information display system.

FIG. 1 depicts part of a retail store including one embodiment of a product information display system arranged according to a preferred embodiment of the present invention. The system includes a plurality of display tags 20 disposed along the front rails 22 of the store's multiple display shelves 24. The prices descriptions and/or special information for all the products can be electronically displayed on the front edges of the shelves, near the respective products. Typically, there is a one-to-one correspondence between each display tag 20 and a particular item of merchandise. Although certain applications may require a display tag 20 to display product-related information regarding multiple products, e.g., the respective products above and below the display tag 20, preferably each display tag 20 displays information for only one product. The tags may also include sensing circuitry which detects the presence or movement of people in the vicinity of the tag. Information regarding movement can be used to alert store personnel to certain adverse situations. For example, the lack of movement of a person about a tag can alert the store personnel to possible shoplifting.

The information to be displayed at each display tag 20 is provided by a system controller (TSC) 28. A communication network is defined, in which the system controller 28 communicates with the display tags 20 through an area controller 31 using multiple conductors $C_1, C_2 \ldots C_n$ (see FIG. 2), each of which forms a loop to communicate with a large number of display tags 20 in a prescribed area. Typically a single area controller (TAC) 31 services at least a thousand tags, and each loop services several hundred tags. Preferably, there is one area controller per aisle; however, in an alternate embodiment one TAC exists for the entire store. Each area controller 31 is contained in an enclosed housing. The system controller 28 regularly communicates with the display tags for monitoring and reporting display tag failures to the system user and for identifying service inquiries and updating the display information, e.g., with price changes. The display tags served by any one of the wire loops are usually located on a number of different shelves.

Figure 2:
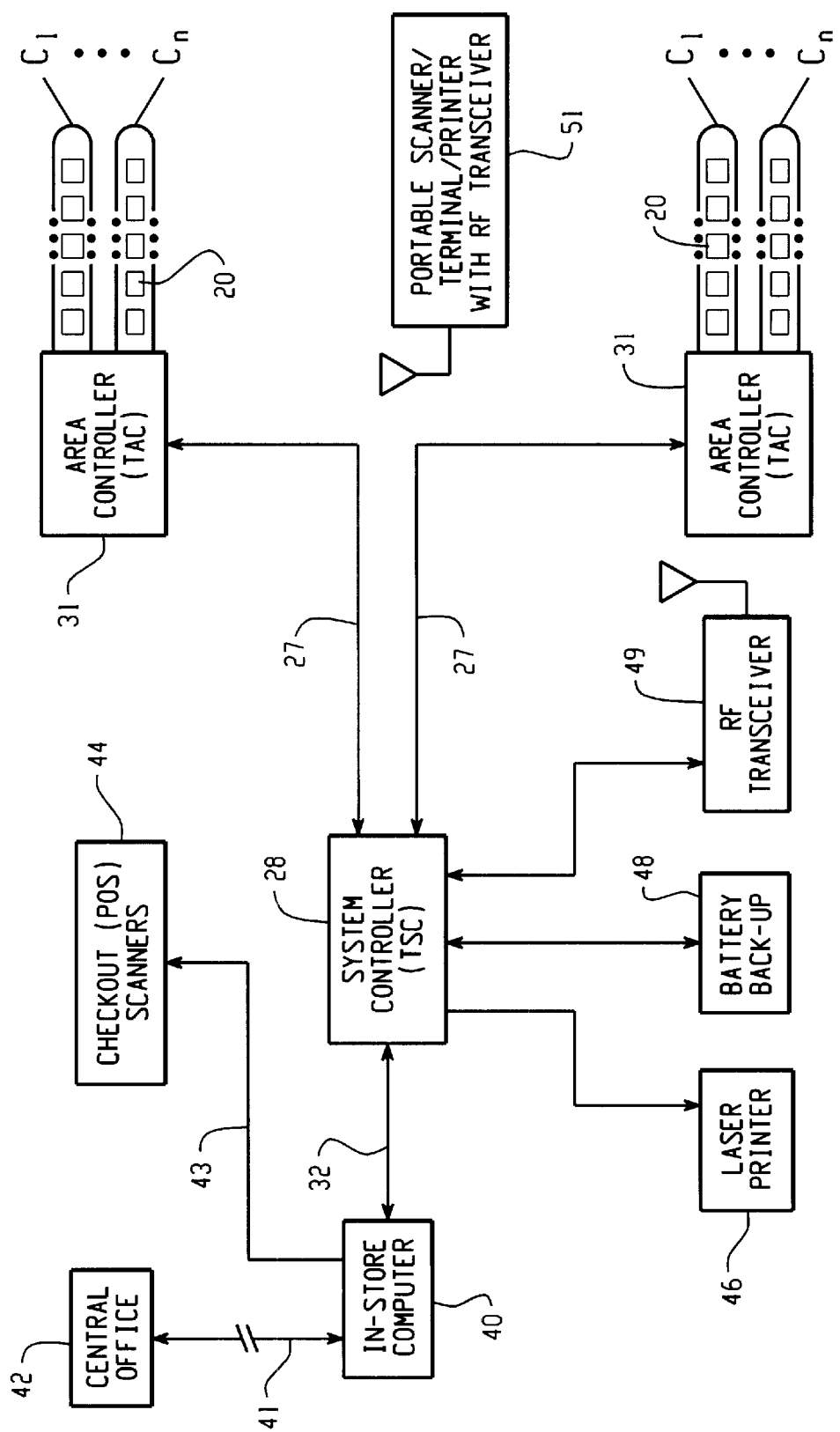
FIG. 2 is a schematic of an electronic product information display system.

FIG. 1 also illustrates a communication link 32 between the system controller 28 and an in-store computer 40 (see FIG. 2). This link 32 is also used by the system controller to receive update price information from the store computer 40 (FIG. 2). The same computer supplies data to both the tags and the scanners so that a new price for a particular product is updated in the display tag 20 at the same time the price is sent to the check-out scanners, thereby ensuring that the price displayed on the display tag 20 for the product is the same as the price displayed for and charged to the customer at the check-out scanner.

The system allows for central office control of the display tags. Employees at a central location can program all tags at all locations. Specifically, it is possible for one tag or one group of tags at one store to be changed from the central office. Additionally, when the system audits tags, the audit information is conveyed to the central office.

Figure 3:
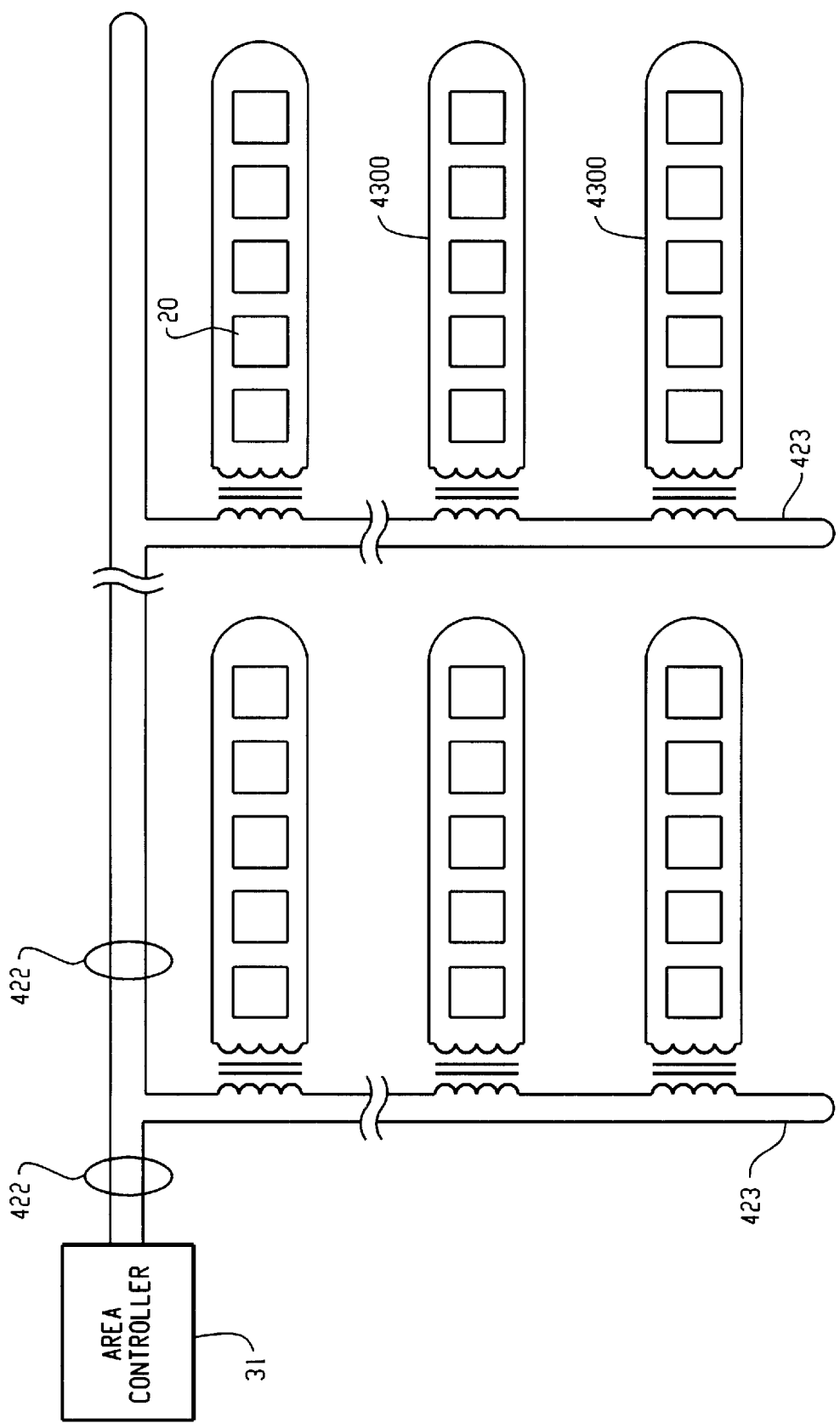
FIG. 3 is a schematic depiction of an area controller to tag communication link.

FIG. 2 illustrates the product information display system of FIG. 1 in block form. The system includes a plurality of area controllers 31 coupling the system controller 28 to various sets of display tags 20. Each set of display tags 20 is associated with one of the multiple wire loops $C_1$–$C_n$ connected to each area controller 31. According to one embodiment, each of the loops $C_1$–$C_n$ is a single loop of wire. According to another embodiment as shown in FIG. 3, each "loop" may be constructed from a number of modular components including a stringer 422, risers 423, and shelf and rail distribution loops 4300. Series loads are created allowing for the uniform distribution of power.

Referring again to FIG. 2, the area controllers 31 communicate with the tags 20 using the "loop" communication scheme described below. Alternatively, this communication can be undertaken using a conventional modulation protocol such as amplitude-shift-keying (ASK), which is a binary form of amplitude modulation. Other communication schemes, such as frequency shift keying (FSK) or phase modulation, can be used instead of ASK if desired.

Communication between the area controllers 31 and the system controller 28 is effected using a conventional serial two-way communication protocol, such as a network interface compatible with the RS422 or RS485 standard. Other protocols may be used without departing from the invention. The system controller 28 is connected to the area controllers 31 using communication network lines 27.

Preferably communication between the system controller and the area controllers 31 is accomplished using a Safe Extra Low Voltage (SELV) which is designated by UL 1950 as typically being a voltage typically below 30 RMS volts, 42.4 volts peak, 60 V DC. Reference to UL 1950 is invited for a more complete description of SELV. By designing the system to be compatible with SELV requirements, the communications network lines 27 may be simply telephone cable. Use of a SELV and telephone wires is desirable because it reduces the cost of wiring and installation and simplifies reconfiguration of the network such as when one or more gondolas are moved within a store. One reason installation and reconfiguration costs are reduced is that electricians and 120 VAC rated elements such as conduit, junction boxes and the like need not be employed as would be the case in most non-SELV applications. Finally, compliance with UL 1950 also provides a level of safety for users of the system in the event of any malfunction of the system and meets many local building codes.

Each of the area controllers 31 is powered by a DC power supply within the system controller 28. Transmitting DC power signals between the system controller and the area controllers is advantageous because it reduces the amount of potentially interfering radiation which would otherwise be produced if AC power signals were employed. The scope of this benefit becomes evidence when it is realized that there are a substantial number of communication lines between the system controller and the area controllers running throughout the ceiling of a store and from the ceiling down to each area controller. The use of DC power signals also conforms to standard off-the-shelf interfaces which contributes to a lower cost, more reliable system.

The system of FIG. 2 also includes an in-store computer 40 which communicates with a remotely located central office 42 using a modem or other type of communication link and with in-store check-out scanners 44. The in-store computer 40 provides a database of information, received from the central office 42 (or from a scanner controller), for all the merchandise in the store. The database is used to link each product with a physical location address, an alphanumeric (or UPC) description, a price and a unit cost and general inventory information. The database may be accessed for the check-out scanners 44 as well as the system controller 28. Changes in the database of the in-store computer 40 are generally initiated by updates received from the central office, but database changes producing display changes can also be made directly at the in-store computer 40.

After receiving the product data from the in-store computer 40, the system controller 28 selects the desired display information and associated display tag address, and converts this display information into a data stream for transmission to the appropriate area controller 31. The area controller 31 then forwards this information to the particular wire loop $C_1$–$C_n$ associated with the designated tag 20.

Also associated with the system controller 28 is a printer 46 and a battery back-up unit 48. The printer 46 may be used to make hard copies of the desired displays, for example on regular or transparent paper, for insertion into a shelf rail at any locations not covered by the electronic tags 20. The printer can also be used to generate store or system reports. These printed reports can be used to audit pricing strategy all the way down to individual shelves and tags. The battery back-up unit 48 is used to maintain system integrity during periods of power interruption.

Advantageously, in operation, in the system described above, the system controller can perform additional functions. For example, when actual price changes or other data are not being sent to the tags 20, the system controller can poll the tags to check on the integrity and correctness of the price and other information stored in the individual tags. As will be described more fully herein below, each of the tags 20 is provided with suitable memory capacity for retaining the necessary product and pricing information. The tags may also be provided with enough memory capacity to store alternative or secondary display information. Importantly, although the system controller is polling the individual tags to check this information, it can also poll the in-store computer 40 to compare the information on the tags with the pricing information for the corresponding items which has been sent by the in-store computer to respective point of sale (POS) or check-out scanners 44, for example at check-out counters or the like. Thus, the system controller when not engaged in other tasks preferably compares the data in the tags with the data being sent to the point of sale scanners to ensure that the two coincide, and to audit and update the information to the tags or to report any discrepancy in the event different information has been conveyed to the point of sale scanners. In such communications, the area controller performs CRCs on the data in the tags.

To facilitate installation of tags 20, an RF transceiver 49 coupled with the system controller may communicate with a portable scanner and terminal/printer with RF transceiver 51, such as a Telxon PTC 960 or other portable wireless terminal which is operable for communication with the TSC 28, carried by a worker in an aisle or other storage/display area. However, the RF transceiver 49 may already be provided with the in-store computer 56, as indicated by the dashed line, in which case, a separate RF transceiver need not be provided for the system controller 28.

Many of the details of the above-described system are provided in U.S. Pat. No. 6,089,453 the specification of which is incorporated herein by reference. Generally, a system controller (TSC) 28 provides power and information to multiple area controllers (TAC) 31. The area controller modulates power and data into a single power/information signal which is distributed over conduct $C_1$–$C_n$. Along each conductor a plurality of electronic display tags 20 are positioned for inductively receiving the power/information signal. The power/information signal is then demodulated within the tag. In this manner power is provided to all of the tags from the system controller and communication between the system controller 28 and tags 20 takes place.

The expanded display functions of the present invention can be implemented in the afore-mentioned system, but it is recognized that such functions could also be implemented in other types of product information display systems such as those operating on an RF communication scheme, an infrared communication scheme, or even hard-wired systems.

In one embodiment, the system controller (TSC) 28 is configured for operation in an expanded retail mode. During the expanded retail mode tags 20 continue to display product information such as price etc. per standard system operation, except that selected tags can be caused to display alternative/secondary information. For example, when the system is placed in an expanded retail mode push-buttons or other input means on the tags 20 are made active and the TACs 31 operate to poll their associated tags for service requests. If a tag button is depressed, a signal is sent to the area controller which the TAC 31 identifies as a service request and the TAC 31 sends a signal to the TSC 28 with the particular tags soft address which causes the system controller to retrieve alternative or secondary display information related to that tag and its associated product from a database, and to then send a signal back through the area controller to the tag with the alternative display information. The tag responsively displays the alternative information for viewing by the store personnel. In one possible arrangement, if the tag button is thereafter depressed again by store personnel, the tag sends a signal to the TAC 31 and so on to the TSC 28 which causes the TSC 28 to again retrieve the primary display information (price info) for that tag and its associated product, and to then send a signal back to the tag which causes the tag to again display the primary information. In another arrangement the TSC 28 controls a timeout operation of the alternative display. In particular, if the tag button is not depressed within a certain time period such as 5 or 10 seconds, and thus the TSC 28 does not receive a service request indication from the TAC 31 associated with the tag, the TSC 28 will automatically send an update display signal to the tag through the TAC 31 to cause the tag to return to display of its primary information. In these embodiments only the specific tag which has its button depressed is sent the alternative information for display purposes.

In another set-up the alternative display information may already be stored in tag memory having been previously sent to the tag by the TSC 31 during, for example, tag initialization or tag update. The TSC 31 may then simply send a signal which triggers the tag to enable alternative displays and the store personnel may simply depress the tag button to cause the change. The tag responsively changes its display to the alternative information. After a timeout period, the TSC 31 may then send a signal disabling alternative displays and causing the tag to revert to its primary display, or the tag itself may include appropriate software/firmware to implement the timeout feature on its own, returning automatically to display of its primary display information which is retained in tag memory. After the specified timeout the tag may also automatically disable its alternative displays.

Alternatively, when one tag button is depressed the TSC 28 may be configured to identify a group of tags in the same vicinity as the triggered tag (or otherwise related to the triggered tag), and to then retrieve and send alternative information to each of the identified tags for display thereby. For example, the typical tag database may identify each tag record by a soft address in combination with its associated TAC 31. Thus, all tags connected to TAC #2 are identified by a number "02softaddress" where the soft address varies for each tag associated with TAC #2. In this manner, in response to a given tag request the TSC 28 can identify all tags associated with the given tag's TAC 31 and cause all tags connected to that TAC 31 to change display information in the above manner. Alternatively, each tag record also stores tag specific location information such as a shelf number, shelf location, and shelf position for planogram purposes as described below. With this arrangement the TSC 28 can be configured to identify all tags in the immediate vicinity of a tag requesting service, and cause all such tags to change their respective display information to a secondary display. This feature enables zones smaller than TAC defined zones to be identified and collectively controlled to display the secondary information. Such a smaller zone may, for example, include the tags on all shelf segments vertically aligned with the particular four foot shelf segment where the requesting tag is located, or might even be limited to all tags on the particular four foot wide shelf segment on which the requesting tag is located.

A zone of tags for display of secondary information may also be selected from a list of zones displayed on RF unit 51, where the TSC communicates the list to the RF unit 51 for display.

Any of the following expanded retail display functions may be performed on a single tag basis, a tag zone basis, or on all tags in a store using the tag selection methods described above. The following discussions describe a single tag selected method.

Figure 4:
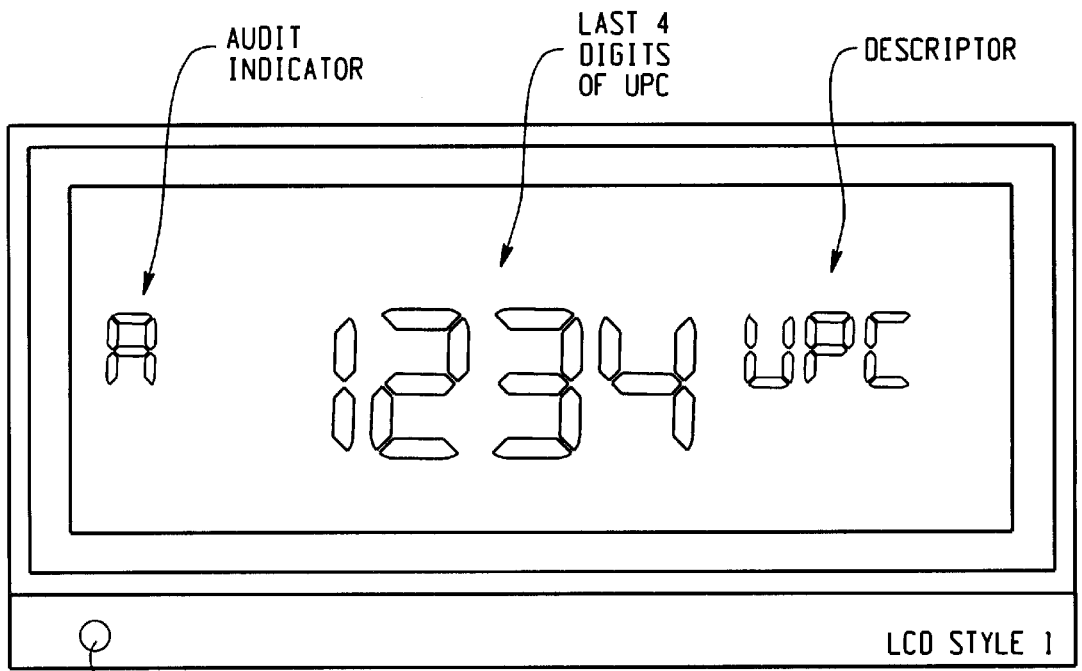
FIG. 4 illustrates display of audit information.

In one possible aspect, the expanded retail display function may be used to provide an audit function within the system. In particular, when a tag button is depressed during the expanded retail audit mode of the system the alternative information retrieved may be Universal Product Code (UPC) information. For example, FIG. 4 illustrates such an alternative display in which an audit indicator ("A") is displayed, the last four digits of the UPC are displayed, and a descriptor ("UPC") designating what the displayed information represents is also displayed. With an audit display, store personnel can verify that the tag is displaying appropriate information for its adjacent product by comparing the last four digits of the displayed UPC with the UPC on the product. If the UPCs match, a single subsequent depression of the tag button may return the tag to its primary display as described above. If the UPCs do not match a double depression of the tag button may trigger the system controller 28 to await information concerning the product, and the store personnel may then use the hand-held RF unit 51 to scan the UPC of the product and send the information to the system controller. The system controller may then update the display information for the tag per its normal procedure. Alternatively, the system may be configured to display the UPC information for a specified time period and automatically revert to the primary display information.

Figure 5:
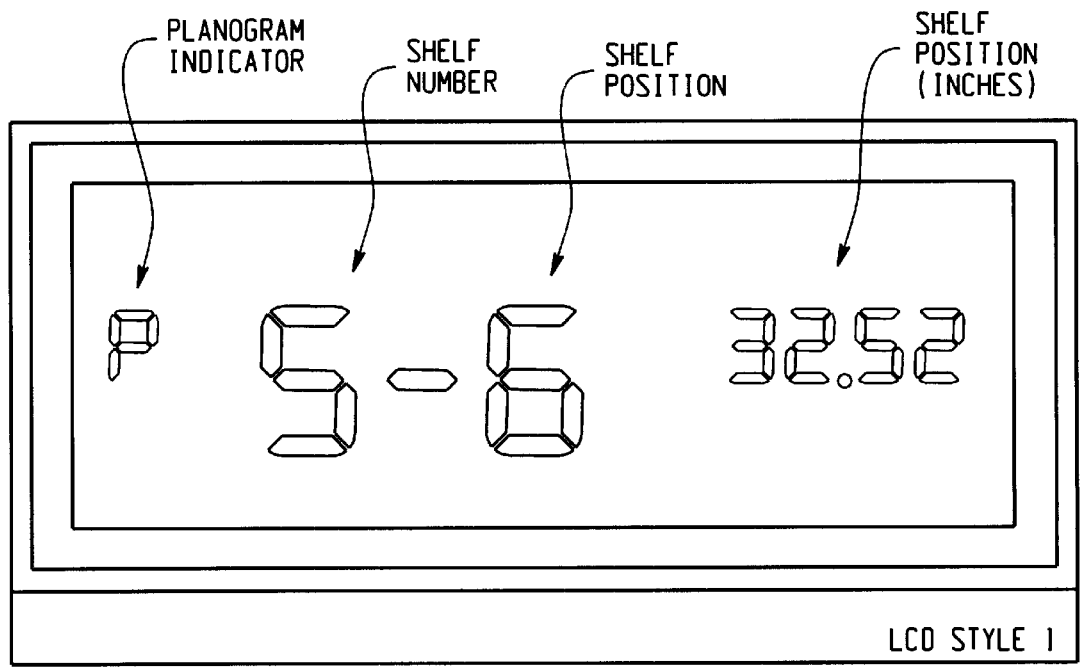
FIG. 5 illustrates display of planogram information.

In another possible aspect, the expanded retail display function may be used to provide a display of planogram information for the product adjacent the particular tag. In particular, the system controller 28 may include a database of planogram type records which identifies the intended position of each product within the store. The records may comprise a separate database or may be associated with another database within the system. FIG. 5 depicts an alternative planogram type display in which a planogram indicator ("P") is displayed, a shelf number ("5") is displayed, a shelf location ("6") is displayed, and a shelf position ("32.52") is displayed. This information may represent the fifth shelf from the bottom, the sixth column of shelve segments, and 32.5 inches from the left hand side of the shelf column. Store personnel may use this information to assure that the product is positioned as intended in the store planogram and to make an adjustment if necessary. The planogram information may be generated at initial store set up and during subsequent revisions to store layout. As changes are made on the floor store personnel may use the hand held RF unit 51 to convey new planogram information to the system controller 28. In conjunction with the displayed shelf position information, the overall system may include shelves which are specially adapted to assist store personnel in determining the distance of products from the left edge of a shelf column. For example, the shelf edge rail or bracket may include a ruler type sticker placed thereon, or alternatively a series of spaced position identifiers such as hash marks or notches.

Figure 6:
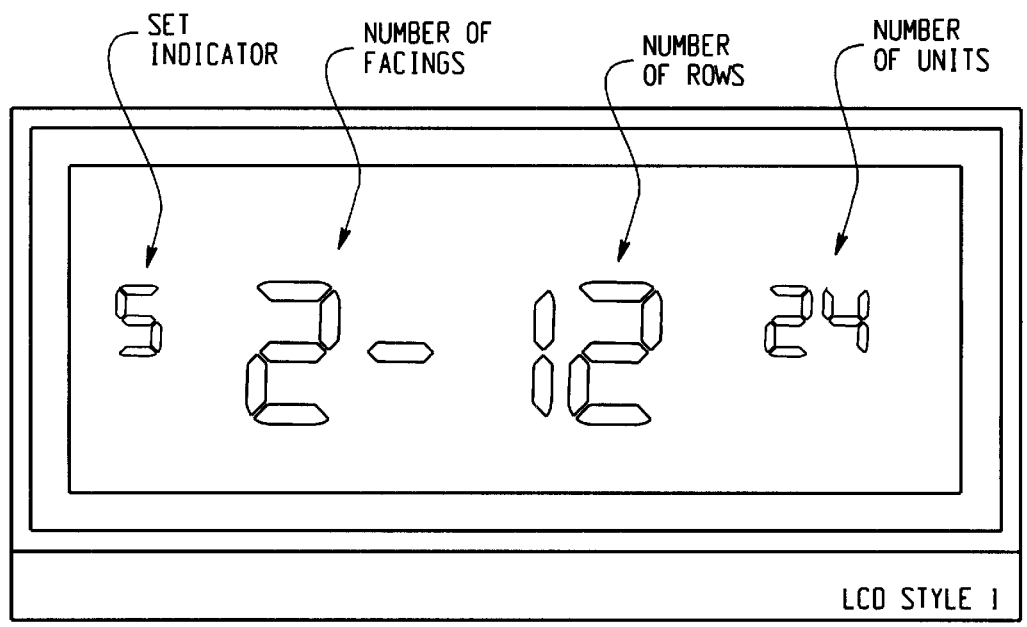
FIG. 6 illustrates display of set appearance information.

In a further aspect, set appearance information for the product associated with a tag may be displayed. FIG. 6 depicts a display of exemplary set appearance information including a set indicator ("S"), a number of facings ("2"), a number of rows ("12"), and a number of units ("24"). For a given product this information is interpreted as suggesting two facings for the product with 12 units in each product facing. Similar to planogram information, store personnel may verify that the product set up is correct and make adjustments when an inconsistency exists, such as when the shelves are being restocked.

Figure 7:
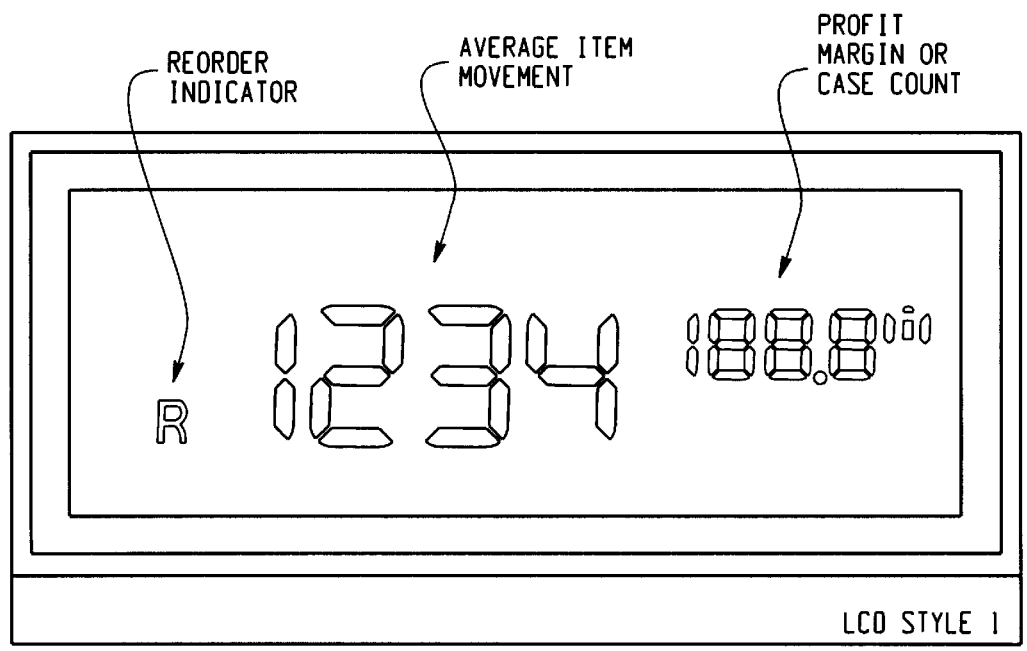
FIG. 7 illustrates display of reorder information.

FIG. 7 illustrates a display of reorder information including a reorder indicator ("R"), an average item movement number ("1234") and a profit margin and/or case count ("188.8"). The average item movement number represents the average number of units of that particular product sold over a given period of time such as a week. Store personnel may compare this information to information regarding the number of cases remaining in stock in order to determine when and how many cases of the particular product to reorder. If the product has little movement and a large number of cases remain in stock, the store personnel may determine to place the product on special, in which case the profit margin information will allow the store personnel to set the product special price within reasonable constraints to avoid excessive losses on the product.

Figure 8:
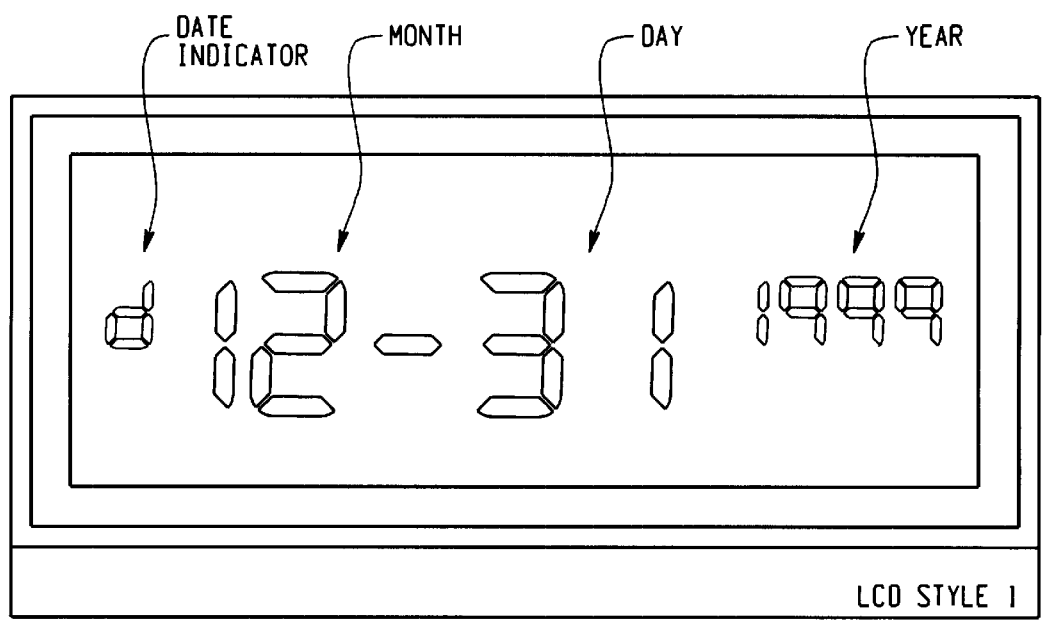
FIG. 8 illustrates display of date information.

Other information such as date information can be displayed. In particular, FIG. 8 shows a display of a date indicator ("d"), a month ("12"), a day ("31") and a year ("1999"). This date could represent the effective date of that product's currently set price. Similarly, the expiration date of that product's currently set price may be displayed. Alternatively, both dates may be sequentially and repeatedly displayed. Store personnel can use the date information for reorder purposes, such as to assist in assuring that proper quantities are on hand to meet demand for advertised specials.

While a given system may be set up to provide just one of the above alternative displays, it is recognized that more than one may be included within the system. For example, if the tag button is depressed once while the system is in the expanded retail mode the audit information may be displayed. If the tag button is instead pressed twice in fast succession, the planogram information may be displayed, and so on down the line. Alternatively, a system may be set up to go through the entire sequence of displays in a given time period or a system may be set up to switch sequentially from one display to the next each time the tag button is depressed. The secondary display timeout feature described above may be used in combination with any of these techniques.

Figure 9:
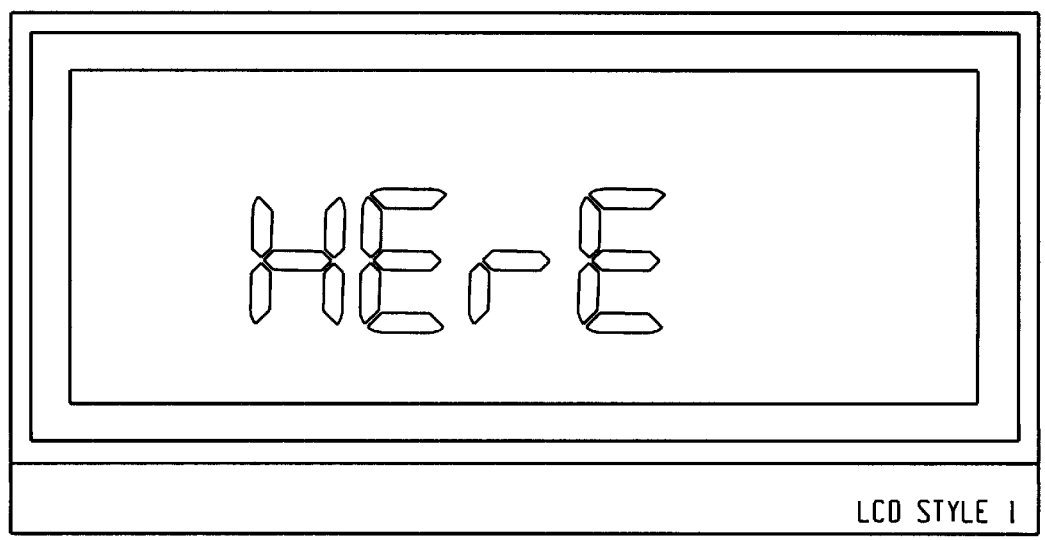
FIG. 9 illustrates display of product locator/verify information.

In a product locator/verify display, the tags display may change to a flashing "here" as shown in FIG. 9 when a product's UPC is scanned by a hand held RF unit 51 in order to assist store personnel in finding the appropriate spot for placing items on the shelves during stocking operations, reducing the time it takes an employee to stock the shelves. Further, if the tag includes a separate LED annunciator or sound element type annunciator (shown as 1000 in FIG. 4), the annunciator may also be triggered to attract the attention of store personnel. In such a "stock to light" mode, all tags flashing their annunciators (indicating a promotional item for example) would first be reloaded by the controller to stop flashing the annunciator when the system is placed in the stock to light expanded retail mode, while the controller maintains a record of such promotional tags such as by storing the information. Store personnel using the portable RF unit then scan a barcode on an item to be stocked (or on a list) and the RF unit 51 sends a signal to the TSC 28. The TSC 28 consults the product database to identify the tag or tags associated with that product. The TSC 28 then sends a signal which causes the tag display screen and/or separate annunciator of the particular tag to flash, and may also send location information such as store aisle # to the RF unit 51 for display by the RF unit 51, enabling store personnel to identify the appropriate location to stock the product. If more than one tag is associated with the product, store personnel may be presented with a list of tags displayed on the RF unit 51 allowing the store personnel to select a tag, with the TSC 28 thereafter sending a signal which causes the selected tags annunciator to flash. A subsequent hand-held RF unit scan of a different product barcode causes the RF unit 51 to send a signal to the TSC 28 which causes the TSC 28 to send a signal which stops the flashing of the annunciator associated with the previously scanned product barcode and a signal which causes the annunciator of the tag(s) associated with the new product barcode scan to begin flashing so that the store personnel can locate the next stock location. When the "stock to light" expanded retail mode is completed, a signal triggered from the RF unit 51 causes the TSC 28 to restore the flashing operation of the annunciators in the promotional tags by retrieving the previously stored record.

In a "pick to light" feature of the system, all tags flashing their annunciators (indicating a promotional item for example) would first be reloaded by the controller to stop flashing the annunciator when the system is placed in the pick to light merchandising mode, while the controller maintains a record of such promotional tags. A customer order list (with quantities) may then be displayed on the display screen of the RF hand-held unit 51. The store personnel selects an item/product from that list utilizing the appropriate input mechanisms (such as buttons or keys) of the RF unit 51 and the RF unit 51 sends a signal to the TSC 28 which causes the TSC 28 to search its product database to identify the tag(s) associated with that product. The TSC then sends a signal or signals which cause the display screen or separate annunciator of the tag(s) associated with the selected item/product to flash so that the store personnel can easily identify the location(s) of the item for retrieval. Information identifying the tag and product location may also be sent to the RF unit 51 for display. Once the appropriate quantity of the item is retrieved the store personnel presses a "step complete" key on the RF unit 51 (or button on the tag), sending a signal to the TSC 28 which causes the TSC 28 to send a signal to the RF unit 51 removing the item from the displayed list of the RF unit. The TSC 28 may also send a signal which causes the annunciator in the tag associated with the next selected item on the list to flash so that the store personnel can retrieve the next item, and so on down the list. If a selected item is too far from the store personnel it can be temporarily skipped by using the RF unit 51 to select the next listed item. Thus, this pick to light technique provides the ability to readily fill a customer's desired shopping list. Advantageously, the feature may work in a dynamic manner by updating the electronically generated list in the RF unit each time an item from the list is retrieved.

Similarly, tag overlay label replacement can be addressed using the flashing display screen and/or separate tag annunciator technique. First, all tags flashing their annunciators (indicating a promotional item for example) would be reloaded by the controller to stop flashing the annunciator when the system is placed in the overlay merchandising mode, while the controller maintains a record of such promotional tags. Next, a list may be sent from the TSC 28 to the RF unit 51 causing the RF unit 51 display the list of tags needing new printed labels. Selecting an item on the list via an input key of the RF unit 51 sends a signal to the TSC 28 with the selected list item information. The TSC 28 then sends a signal to the selected tag which causes the annunciator in the one (and only one) selected shelf tag to flash and also sends a signal to the RF unit 51 with print information which causes a new label to be printed by the printer connected to the RF unit 51. Tag location information may also be sent from the TSC 28 to the RF unit 51 for display. The store personnel goes to the tag location and applies the newly printed label to the flashing tag and then presses a "step complete" button of the RF unit 51 (or button on the tag). That item is then removed from the list displayed by the RF unit 51 and the next tag on the list is selected causing its annunciator to flash, and so on down the list. Selected items can be temporarily skipped if necessary. When the overlay function is completed (either no items on the list remain or operation aborted), the TSC 28 causes all promotional tags to again flash their annunciators. If the function is aborted, pending items on the list are retained by the TSC 28 for subsequent overlay label replacement.

To update the placement of beard tags (aka, bibs) two different methods might be employed, the guided method or the batch method.

In the guided method the TSC 28 communicates to the RF unit 5 a list of the items or tags needing beard tag maintenance and the list is displayed by the RF unit 51. Selecting an item on the list using the RF unit 51 causes the unit to communicate the selection information to the TSC 28. The TSC 28 then sends a signal to the display tag associated with that item/product causing it to flash its annunciator in a manner similar to that described above. Tag location information may also be sent from the TSC 28 to the RF unit 51 for display. The store personnel goes to that physical location and performs the beard tag operation specified on the RF unit list. Operations may include removing or installing particular beard tags which identify particular features of the product (such as frequent shopper special, web special, advertised special). When the required beard tag maintenance is complete the store personnel presses a "step complete" key on the RF unit 51 (or button on the tag) which causes that item to be removed from the electronic list and causes the tag associated with the next item on the list to flash. As above, selected items can be temporarily skipped. When the beard tag maintenance function is completed (either no items on the list remain or function aborted), the TSC 28 causes all promotional tags to again flash their annunciator. If the function is aborted, pending items on the list are retained by the TSC 28 for subsequent beard tag maintenance.

In the beard tag maintenance batch method the store personnel can perform the same beard tag operation (e.g. remove web special beard tag) on all tags within a given zone. The zone and operation are selected using the RF unit 51 to send a signal to the TSC 28 which, for example, identifies a particular store aisle as a zone causing all tags in need of the particular beard tag maintenance in that aisle to begin flashing their annunciator. The store personnel performs a single operation in the zone (such as removing all web special beard tags as necessary in that zone) and then presses a "step complete" key of the RF unit 51 which sends a signal to the TSC 28 to identify the next operation for that zone (such installing web special beard tags for different products) and the tags to be flashed in connection with that next operation.

The batch method allows a verify mode to insure that beard tags are placed properly in each zone. For example, if a "verify beard tag-frequent shopper" mode is selected for a given store personnel or other store zone, the TSC 28 causes each tags in that zone which should have a frequent shopper beard tag to flash its annunciator so that the store personnel can verify whether or not such beard tags are present. The guided method insures higher beard tag placement integrity with store personnel acknowledgment at every tag needing service and reduces the steps. Either method is an improvement to known techniques which involve the use of a hard copy, printed list because the techniques of the present invention use a dynamically changing electronic list on the RF unit 51 and annunciators on the tags to guide the store personnel.

For any of the above functions, where annunciators such as LED flashers are not present in the display tags, icons on the LCD unit can provide a similar annunciator functionality. As used herein the term annunciator is intended to encompass light emitting elements separate from a tag display screen, icons on or segments of the tag display screen, and sound element type annunciators. Where multiple LED flashers are available on the tags (e.g. red and yellow) one color may be used for promotion while the other color is simultaneously used for one of the expanded retail modes.

Although the invention has been described above in detail referencing the preferred embodiments thereof, it is recognized that various changes and modifications could be made without departing from the spirit and scope of the invention.

What is claimed is:

1. In an electronic product information display system including multiple product storage plurality of electronic display tags associated with the product storage areas to display product information, a multiplicity of electronic display tags each including an annunciator, a controller connected for communication with the electronic display tags and connected for accessing a database identifying products associated with particular electronic display tags, and a portable wireless terminal operable for communication with the controller, a method for locating a desired product associated with and located proximate to at least one electronic display tag of the multiplicity of display tags, the method comprising the steps of:
   (a) identifying the desired product using the portable wireless terminal;
   (b) communicating the desired product to the controller using the portable wireless terminal;
   (c) identifying, by the controller, the at least one electronic display tag associated with the desired product via a database check according to the desired product;
   (d) communicating, from the controller to the identified electronic display tag, a signal for activating the annunciator of the identified electronic display tag.

2. The method of claim 1, wherein, prior to step (a), the following steps are performed:
   (i) the controller stopping all annunciator activity of the multiplicity of electronic display tags; and
   (ii) the controller storing a record of tags which had active annunciators.

3. The method of claim 2, further comprising:
   (e) repeating steps (a) through (d) for a plurality of desired products, where each desired product is associated with and located proximate to a respective one of the multiplicity of electronic display tags.

4. The method of claim 3, comprising the further steps of:
   (f) after step (e), the controller retrieving the previously stored record of tag annunciator activity; and
   (g) the controller reactivating the annunciators according to the retrieved record of tag annunciator activity.

5. The method of claim 1, wherein each of the multiplicity of electronic display tags includes a product information display screen and the annunciator of each of the multiplicity of electronic display tags is a light emitting element that is separate from the product information display screen.

6. The method of claim 5, wherein the annunciator is a sound element type annunciator.

7. The method of claim 1 comprising the further steps of:
   (1) the controller retrieving a tag location of the identified electronic display tag and communicating the tag location to the portable wireless terminal;
   (2) the portable wireless terminal displaying the received tag location for observation by a user.

8. In an electronic product information display system including multiple product storage areas, a plurality of display tags associated with the product storage areas to display product information, a multiplicity of the display tags each including an annunciator, a controller connected for communication with the display tags, a portable wireless terminal operable for communication with the controller, a method for retrieving multiple products stored in the product storage areas, the method comprising the steps of:
   (a) uploading a product list to the portable wireless terminal and displaying at least part of the list on a display of the portable wireless terminal;
   (b) selecting a desired product from the product list of the portable wireless terminal;
   (c) communicating the desired product to the controller using the portable wireless terminal;
   (d) the controller identifying a display tag associated with the desired product and activating the annunciator of the associated display tag;
   (e) retrieving the desired product;
   (f) marking the desired product as retrieved on the product list on the portable wireless terminal;
   (g) updating the product list on the portable wireless terminal by removing the retrieved product from the product list; and (h) repeating steps (b) through (g) for multiple products on the product list.

9. The method of claim 8, wherein the system is operable in a plurality of modes and prior to step (a) the following steps are performed:
(1) switching the system from an operating mode to a product locate mode;
(2) the controller stopping all display tag annunciator activity in response to the mode switch;
(3) the controller storing a record of which display tags had active annunciators.

10. The method of claim 9 wherein after step (h) the following steps are performed:
(i) returning the system to the operating mode;
(j) the controller retrieving the previously stored record of tag annunciator activity; and
(k) the controller reactivating the annunciators according to the retrieved record.

11. In an electronic product information display system including multiple product storage areas, a plurality of display tags associated with the product storage areas to display product information areas, a multiplicity of the display tags each including an annunciator, a controller connected for communication with the display tags, and a portable wireless terminal operable for communication with the controller and having a scanner for scanning product codes, a method for facilitating product stocking to the product storage areas, the method comprising the steps of:
(a) using the portable wireless terminal, scanning a product code of a given package of a particular product in order to identify information regarding the particular product, where the given package is one that (i) is not yet located at one of the product storage area and (ii) is to be stocked;
(b) communicating said information regarding the particular product to the controller;
(c) the controller identifying a display tag associated with the particular product and activating the annunciator of the associated display tag to alert a user or users to a particular product storage area proximate to the associated display tag and that is the appropriate stocking location for the given package.

12. The method of claim 11, comprising the further steps of:
(d) the user or users stocking the given package at the particular product storage area; and
(e) deactivating the annunciator of the associated display tag of step (c); and
(f) repeating steps (a) through (e) for a multiplicity of different products.

13. The method of claim 12, wherein prior to step (a) the following steps are performed:
(1) switching the system from an operating mode to a product stock mode;
(2) the controller stopping all annunciator activity in response to the mode switch;
(3) the controller storing a record of which display tags had active annunciators.

14. The method of claim 13 wherein after step (e) the following steps are performed:
(f) returning the system to the operating mode;
(g) the controller retrieving the previously stored record of tag annunciator activity; and
(h) the controller reactivating the annunciators according to the retrieved record of tag annunciator activity.

15. The method of claim 1 comprising the further steps of:
(1) the controller retrieving a tag location of the identified display tag and communicating the tag location to the portable wireless terminal;
(2) the portable wireless terminal displaying the received tag location for observation by a user.

16. In an electronic product information display system including multiple product storage areas, a plurality of display tags associated with the product storage areas to display product storage areas to display production information; multiplicity of the display tags each including an annunciator, a controller connected for communication with the display tags, a portable wireless terminal operable for communication with the controller, and a printer associated with the portable wireless terminal, a method for replacing at least one overlay label for a display tag, the method comprising the steps of:
(a) uploading a display tag or product list to the portable wireless terminal and displaying at least part of the list on a display of the portable wireless terminal;
(b) selecting a list item from the list on the portable wireless terminal;
(c) communicating the list item to the controller using the portable wireless terminal;
(d) the controller activating an annunciator of a given display tag associated with the selected list item;
(e) the controller communicating print information for the given display tag to the portable wireless terminal;
(f) the portable wireless terminal causing the printer to print a new overlay label for the given display tag according to the received print information.

17. The method of claim 16 comprising the further steps of:
(g) applying the new overlay label to the given display tag;
(h) marking the list item associated with the given display tag as updated on the list of the portable wireless terminal;
(j) updating the list of the portable wireless terminal by removing the list item associated with the given display tag from the list; and
(k) repeating steps (b) through (I) for each list item remaining on the list of the portable wireless terminal.

18. The method of claim 17, wherein prior to step (a) the following steps are performed:
(1) switching the system from an operating mode to an overlay merchandising mode;
(2) the controller stopping all annunciator activity in response to the mode switch;
(3) the controller storing a record of which display tags had active annunciators.

19. The method of claim 18 wherein after step (k) the following steps are performed:
(l) returning the system to the operating mode;
(m) the controller retrieving the previously stored record of tag annunciator activity; and
(n) the controller reactivating the annunciators according to the retrieved record of tag annunciator activity.

20. In an electronic product information display system including multiple product storage areas, a plurality of display tags associated with the product storage areas to display product information areas, a multiplicity of the display tags each including an annunciator, a controller connected for communication with the display tags, and a portable wireless terminal operable for communication with the controller, a method for performing display tag maintenance, the method comprising the steps of:

(a) uploading a display tag or product list to the portable wireless terminal and displaying at least part of the list on a display of the portable wireless terminal;

(b) selecting a list item from the list on the portable wireless terminal;

(c) communicating the list item to the controller using the portable wireless terminal;

(d) the controller activating an annunciator of a given display tag associated with the selected list item;

(e) a person locating the given display tag via the annunciator and performing required display tag maintenance.

21. The method of claim 20 comprising the further steps of:

(f) marking the list item associated with the given display tag as updated on the list of the portable wireless terminal;

(g) updating the list of the portable wireless terminal by removing the list item associated with the given display tag from the list; and (h) repeating steps (b) through (g) for each list item remaining on the list of the portable wireless terminal.

22. The method of claim 21, wherein prior to step (a) the following steps are performed:

(1) switching the system from an operating mode to tag maintenance mode;

(2) the controller stopping all annunciator activity in response to the mode switch;

(3) the controller storing a record of which display tags had active annunciators.

23. The method of claim 22 wherein after step (h) the following steps are performed:

(i) returning the system to the operating mode;

(j) the controller retrieving the previously stored record of tag annunciator activity; and (k) the controller reactivating the annunciators according to the retrieved record of tag annunciator activity.

24. The method of claim 9, wherein the each of the multiplicity of display tags includes a product information display screen and the annunciator of each of the multiplicity of display tags is separate from the product information display screen.

25. The method of claim 13, wherein the each of the multiplicity of display tags includes a product information display screen and the annunciator of each of the multiplicity of display tags is separate from the product information display screen.

26. The method of claim 18, wherein the each of the multiplicity of display tags includes a product information display screen and the annunciator of each of the multiplicity of display tags is separate from the product information display screen.

27. The method of claim 22, wherein the each of the multiplicity of display tags includes a product information display screen and the annunciator of each of the multiplicity of display tags is separate from the product information display screen.

* * * * *

UNITED STATES PATENT AND TRADEMARK OFFICE
CERTIFICATE OF CORRECTION

PATENT NO.    : 6,552,663 B2
DATED         : April 22, 2003
INVENTOR(S)   : Stanley J. Swartzel et al.

It is certified that error appears in the above-identified patent and that said Letters Patent is hereby corrected as shown below:

Column 11,
Line 58, after the word "storage" insert -- areas, a --.
Line 60, after the words "multiplicity of" insert -- the --.

Column 13,
Line 23, delete the word "areas".
Line 34, the word "area" should be -- areas --.

Column 14,
Line 10, delete "display product storage areas to".
Line 11, after "," insert -- a --.
Line 44, replace "(I)" with -- (j) --
Line 65, delete the word "areas".

Signed and Sealed this

Fifth Day of August, 2003

JAMES E. ROGAN
*Director of the United States Patent and Trademark Office*